(12) United States Patent
Davis et al.

(10) Patent No.: US 11,869,677 B2
(45) Date of Patent: Jan. 9, 2024

(54) BREEDER BLANKET FOR NUCLEAR FUSION REACTOR

(71) Applicant: Tokamak Energy Ltd, Abingdon (GB)

(72) Inventors: Thomas Davis, Evesham (GB); Simon Middleburgh, Chester (GB); Jack Astbury, Abingdon (GB); Gurdeep Kamal, Abingdon (GB)

(73) Assignee: Tokamak Energy Ltd, Abingdon (GB)

( * ) Notice: Subject to any disclaimer, the term of this patent is extended or adjusted under 35 U.S.C. 154(b) by 0 days.

(21) Appl. No.: 18/253,536

(22) PCT Filed: Nov. 19, 2021

(86) PCT No.: PCT/EP2021/082283
§ 371 (c)(1),
(2) Date: May 18, 2023

(87) PCT Pub. No.: WO2022/106609
PCT Pub. Date: May 27, 2022

(65) Prior Publication Data
US 2023/0326616 A1    Oct. 12, 2023

(30) Foreign Application Priority Data

Nov. 19, 2020    (GB) .................................. 2018198

(51) Int. Cl.
*G21B 1/13* (2006.01)
*G21G 1/02* (2006.01)
(Continued)

(52) U.S. Cl.
CPC .................. *G21B 1/13* (2013.01); *G21B 1/19* (2013.01); *G21G 1/001* (2013.01); *G21G 1/02* (2013.01); *G21G 2001/0094* (2013.01)

(58) Field of Classification Search
CPC . G21B 1/13; G21B 1/19; G21G 1/001; G21G 1/02; G21G 2001/0094
(Continued)

(56) References Cited

U.S. PATENT DOCUMENTS

| 3,969,631 A | 7/1976 | Winsche et al. |
|---|---|---|
| 4,199,402 A | 4/1980 | Ahmed |

(Continued)

FOREIGN PATENT DOCUMENTS

| CN | 108320816 A | 7/2018 |
|---|---|---|
| FR | 2061769 A1 | 6/1971 |

(Continued)

OTHER PUBLICATIONS

Great Brittain Patent Office Action for Related Application No. GB2018198.8 dated Mar. 5, 2021 (4 pages).
(Continued)

*Primary Examiner* — Jack W Keith
*Assistant Examiner* — Daniel Wasil
(74) *Attorney, Agent, or Firm* — Michael Best & Friedrich LLP

(57) ABSTRACT

A breeder blanket for generating tritium using neutrons produced by nuclear fusion of deuterium and/or tritium within a plasma confined within a fusion reactor. The breeder blanket comprises: a plasma-facing first wall; a breeder layer comprising lithium containing material for generating tritium from the neutrons; and neutron moderator material comprising metal hydride and/or deuteride arranged between the first wall and the lithium-containing material.

20 Claims, 3 Drawing Sheets

(51) Int. Cl.
*G21G 1/00* (2006.01)
*G21B 1/19* (2006.01)

(58) Field of Classification Search
USPC .......................................................... 376/150
See application file for complete search history.

(56) References Cited

U.S. PATENT DOCUMENTS

| | | | |
|---|---|---|---|
| 4,217,171 A | 8/1980 | Schaeffer | |
| 4,436,695 A | 3/1984 | Marwick | |
| 6,411,666 B1* | 6/2002 | Woolley | G21B 1/13 376/150 |
| 2012/0250812 A1* | 10/2012 | Weaver | G21B 1/13 376/150 |

FOREIGN PATENT DOCUMENTS

| | | | |
|---|---|---|---|
| GB | 908020 A | 10/1962 | |
| JP | S6344198 A | 2/1988 | |
| JP | H06242272 A | 9/1994 | |
| JP | 2017181445 A | 10/2014 | |
| JP | 6715428 B2 | 7/2020 | |
| JP | 6732670 B2 | 7/2020 | |
| RU | 2231140 C1 | 6/2004 | |
| RU | 2399966 C2 | 9/2010 | |
| RU | 2649854 C1 | 4/2018 | |

OTHER PUBLICATIONS

International Search Report and Written Opinion for Related Application No. PCT/EP2021/082283 dated Feb. 16, 2022 (16 pages).
International Preliminary Report on Patentability for Related Application No. PCT/EP2021/082283 dated Nov. 2, 2022 (14 pages).
Takatsu, et al., "Development of ceramic breeder blankets in Japan," Fusion Engineering and Design, vol. 39-40, dated Sep. 1, 1998, (pp. 645-650).
Translation of the Russian Search Report for Application No. 2023115505 dated Aug. 8, 2023 (2 pages).

* cited by examiner

BREEDER BLANKET FOR NUCLEAR FUSION REACTOR

CROSS-REFERENCE TO RELATED APPLICATION(S)

This application is a national phase entry of PCT/EP2021/082283, filed on Nov. 19, 2021, which claims priority to GB 2018198.8, filed on Nov. 19, 2020, the entire contents of which are fully incorporated herein by reference.

TECHNICAL FIELD

The present invention relates to breeder blankets for generating tritium in fusion reactors, e.g. tokamak fusion reactors.

BACKGROUND

The challenge of producing fusion power is hugely complex. Fusion neutrons are produced when a deuterium-tritium (D-T) or deuterium-deuterium (D-D) plasma becomes very hot so that the nuclei fuse together, releasing highly energetic neutrons. For example, around 80% of the 17.6 MeV of energy generated by fusion of deuterium and tritium is acquired by the released neutron (as opposed to the alpha particle co-product, which has a mass than is four times heavier). This reaction is summarised in the following equation:

$$_1^2D + {}_1^3T \rightarrow {}_2^4He(3.52\ MeV) + n^0(14.06\ MeV).$$

Whilst deuterium is readily available, tritium is difficult to obtain in the quantities needed for fusion reactors because it is radioactive (with a half-life of 12.3 years) and no readily extractable sources of tritium exist on Earth. Some fusion reactor designs therefore aim to generate or "breed" tritium within the reactor using the energetic neutrons produced when the reactor is operated. One approach uses neutron activation of lithium nuclei to generate the tritium according to the following nuclear reactions:

$$_3^6Li + n^0 \rightarrow {}_2^4He + {}_1^3T + 4.78\ MeV$$

$$_3^7Li + n^0 \rightarrow {}_2^4He + {}_1^3T + n^0 - 2.47\ MeV$$

$$_3^7Li + n^0 \rightarrow 2{}_1^3T + 2n^0 - 10.3\ MeV$$

The lithium is generally contained within a so-called "breeder blanket" installed on an inner wall of the reactor. The lithium may be provided as a metal (or alloy) or as lithium containing compounds, e.g. lithium-bearing ceramic materials, such as $Li_2O$, $LiAlO_2$, $Li_2ZrO_3$, $Li_4SiO_4$ etc. A neutron multiplier material is generally added (e.g. lead alloyed with the lithium) to provide extra neutron population to counter the neutron leakage from the system and to improve the tritium breeding ratio (TBR) of the blanket (i.e. the mean number of tritium nuclei generated per fusion neutron produced by the reactor). Metals such as beryllium, lead, and tin have been proposed as neutron multiplier materials via the (n, 2n) reaction. Molten salt materials have been proposed as tritium breeding materials, such as $Li_2F$—$BeF_2$.

To date, the most promising way of achieving nuclear fusion is to confine the deuterium and tritium nuclei magnetically using a tokamak. In the conventional tokamak approach to fusion (as embodied by the International Thermonuclear Experimental Reactor, ITER), the plasma needs to have high confinement time, high temperature, and high density to optimise this process. A tokamak features a combination of strong toroidal magnetic field $B_T$, high plasma current $I_p$ and usually a large plasma volume and significant auxiliary heating, to provide a hot stable plasma so that fusion can occur. The auxiliary heating (for example via tens of megawatts of neutral beam injection of high energy H, D or T) is necessary to increase the temperature to the sufficiently high values required for nuclear fusion to occur, and/or to maintain the plasma current.

Ensuring that the tokamak reactor is as compact as possible allows greater efficiency, particularly for "spherical tokamaks" in which the inner radius of the torus is minimised. For example, minimising the distance between the plasma and the field coils allows a higher magnetic field in the plasma with a lower current in the coils. However, compact tokamaks present a number of additional challenges compared to larger designs that need to be overcome in order to achieve a working fusion reactor. For example, the surface area to volume ratio of smaller (e.g. spherical) tokamaks is generally much smaller than the surface area to volume ratio of larger tokamaks. This characteristic feature of spherical tokamaks poses challenges for breeding tritium as the tritium breeding ratio (TBR) is dependent on the neutron flux through the surface area of the tokamak first-wall. In general, spherical tokamaks have less surface area dedicated for breeding tritium compared to conventional large scale ITER-like devices due to the reduction of physical size, but also loss of breeding "real estate" within the central column. The TBR must typically be greater than 1.05 to make a viable breeding system in any fusion device to compensate for losses of tritium within the device, the efficiency with which the tritium can be extracted, and losses due to radioactive decay.

SUMMARY

According to a first aspect of the present invention, there is provided a breeder blanket for generating tritium using neutrons produced by nuclear fusion of deuterium and/or tritium within a plasma confined within a fusion reactor. The breeder blanket comprises: a plasma-facing first wall; a breeder layer comprising lithium-containing material for generating tritium from the neutrons; and neutron moderator material comprising metal hydride and/or deuteride arranged between the first wall and the lithium-containing material.

The neutron moderator material may be provided as a neutron moderator layer arranged between the first wall and the breeder layer.

The neutron moderator material reduces the energy of the neutrons produced from the plasma to facilitate neutron capture by lithium-6 nuclei within the lithium-containing material.

The neutron moderator layer may be configured to transmit more than 60%, preferably more than 80%, or more preferably more than 95%, of the neutrons having an energy of 14 MeV prior to entering the neutron moderator layer.

The neutron moderator layer may be configured to reduce the energy of at least a proportion of the transmitted neutrons by more than 95%, preferably by more than 99%, the neutrons having an energy of 14 MeV prior to entering the neutron moderator layer. The proportion may be greater than 10%, preferably greater than 50%, and more preferably greater than 70%.

The thickness of the neutron moderator layer may be from 0.5 cm to 25 cm, preferably from 2 cm to 15 cm.

The thickness of the breeder layer may be from 1 cm to 200 cm, preferably from 5 cm to 150 cm.

In some examples, no breeder layer is provided between the first wall and the neutron moderator layer.

The breeder blanket may further comprise another neutron moderator layer comprising metal hydride and/or deuteride, the breeder layer being arranged between the neutron moderator layers. The other neutron moderator layer may be configured to reflect a greater proportion of neutrons than the neutron moderator layer between the first wall and the breeder layer. The other neutron moderator layer may be thicker than the neutron moderator layer.

The breeder blanket may comprise another breeder layer comprising lithium containing material for generating tritium from the neutrons, the other neutron moderator layer being arranged between the breeder layers.

The breeder layer(s) and the neutron moderator layer(s) may be separated from one another by one or more metal layers.

Alternatively or additionally, the neutron moderator material may be provided within the breeder layer, the neutron moderator material being separated from the lithium containing material in the breeder layer by one or more layers of metal. For example, the breeder layer may comprise a plurality of pellets comprising the neutron moderator material, the pellets being dispersed within the lithium containing material.

As another example of the neutron moderator material being provided within the breeder layer, the breeder layer may comprise a plurality of rods comprising the neutron moderator material, each rod preferably having a longitudinal axis arranged substantially parallel to the first wall. The longitudinal axis is preferably arranged vertically. The breeder blanket may comprise fixings for holding each of the rods in a fixed position within the breeder layer, the fixings being configured to allow the rods to be removed from and replaced within the breeder layer. The breeder layer may comprise a first region located closer to the first wall than a second region, the rods in the first region being more closely spaced from one another than the rods in the second region.

The ratio of metal atoms to hydrogen and/or deuterium atoms in the metal hydride and/or deuteride may be from 0.5 to 5.5, preferably from 1.0 to 2.0.

The metal hydride and/or deuteride may be or may comprise yttrium hydride and/or deuteride.

The percentage of lithium in the lithium-containing material that is lithium-6 may be greater than 7.6%, preferably greater than 20%, and more preferably greater than 50%.

The lithium-containing material may comprise one or more of a lithium metal, an alloy comprising lithium and/or a ceramic material comprising lithium The breeder blanket may comprise a neutron multiplier material such as beryllium lead, tin and/or uranium. In some examples, the breeder blanket may comprise a molten salt that contains both the lithium and neutron multiplier together such as a molten salt comprising lithium fluoride and beryllium fluoride, $Li_2F$—$BeF_2$.

According to a second aspect of the present invention, there is provided a fusion reactor comprising one or more breeder blankets according to the first aspect of the invention. The fusion reactor may be a tokamak fusion reactor. The tokamak may be a spherical tokamak, preferably a spherical tokamak having an aspect ratio of less than or equal to 2.5, the aspect ratio being defined as the ratio of the major and minor radii of a toroidal plasma-confining region of the tokamak.

According to a third aspect of the present invention there is provided a method of operating a fusion reactor according to the second aspect of the present invention. The method comprises generating tritium using the one or more breeder blankets and neutrons produced by nuclear fusion of deuterium and/or tritium within the fusion reactor and introducing the generated tritium into a plasma confined within the fusion reactor.

As the breeder blanket zone of the fusion reactor receives a high neutron flux, alternative and/or co-generation uses of breeder blankets can be implemented to utilise the neutron flux for isotope production, materials surveillance programmes for the fusion industry, and diagnostics. Accordingly, the method may further comprise using neutrons moderated by the neutron moderator material to irradiate one or more specimens provided within the breeder blanket in order to carry out one or more of: isotope production (e.g. medical radioisotope production), materials testing, transmutation of nuclear waste; and surveillance of the neutron flux produced by the fusion reactor. For example, the method may comprise: inserting a specimen into the breeder blanket, irradiating the specimen using neutrons moderated by the neutron breeder blanket; and removing the specimen from the breeder blanket. The specimen may be analysed during and/or after irradiation (and preferably before irradiation as well) to determine the effect of the neutrons on the specimen. These steps may be repeated a number of times to allow changes in the specimen resulting from repeated irradiation to be measured.

DETAILED DESCRIPTION

Figure 1:
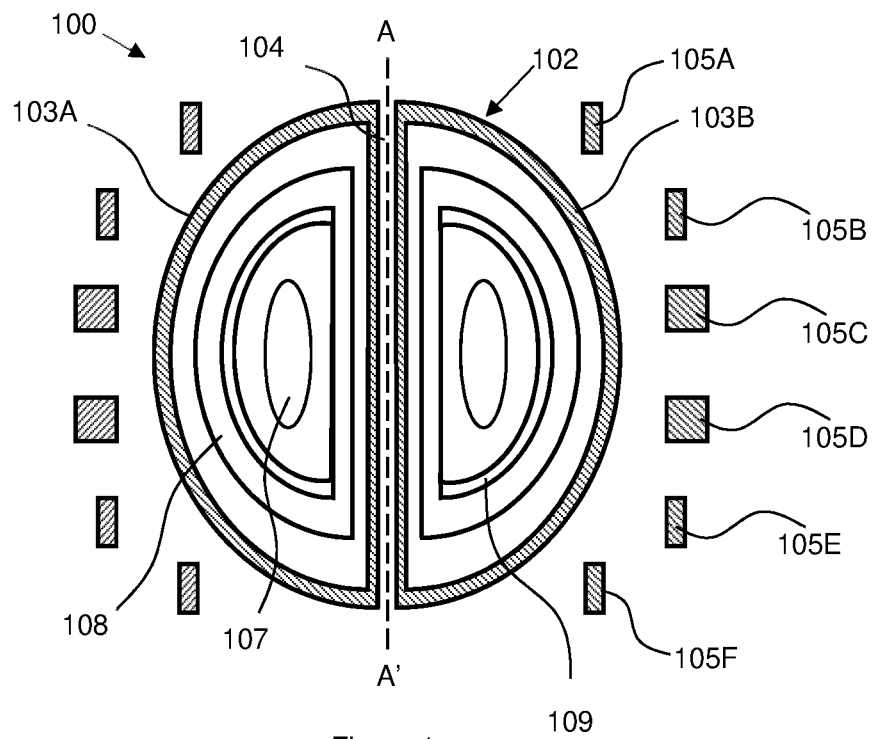
FIG. 1 is a schematic vertical cross section view of a tokamak according to an embodiment of the present invention.

It is an object of the present disclosure to provide a breeder blanket for a fusion reactor that addresses, or at least alleviates, the problems described above.

The tritium ($^3T$) breeding ratio of a breeder blanket containing lithium depends strongly on the energy of the neutrons entering the breeder blanket as a result of the energy dependence of the neutron absorption cross sections for the different isotopes of lithium. In the case of $^6Li$, the neutron absorption cross section is (predominantly) inversely dependent of the neutron energy, i.e. the lower the neutron energy, the higher probability of neutron activation of $^6Li$ and hence tritium production. For example, the neutron absorption cross section of $^6Li$ is of the order of 100 barns and 1000 barns for neutron energies of around 10-6 MeV and 10-6 MeV, respectively, but about 0.05 barns for neutron energies around 10 MeV. By contrast, the neutron absorption cross-section of $^7Li$ is approximately 2.5 times larger than that of $^6Li$ for neutron energies greater than around MeV, but negligible for neutron energies below 1 MeV. The tritium breeding ratio of a breeder blanket therefore depends on the ratio of lithium-6 and lithium-7 in the lithium-containing material as well as the energy of the incident neutrons, the neutron flux and the volume of lithium containing material. Naturally occurring lithium comprises 92.5% $^7$Li and only 7.5% $^6$Li. Therefore, in many cases, fusion reactors that produce "fast" (i.e. an energy greater than 1 MeV) neutrons may require relatively large amounts of lithium-containing material in order to obtain viable tritium breeding ratios predominantly through neutron activation of $^7$Li. However, this approach may not be practical for compact (e.g. spherical) tokamaks, which require more space efficient designs and lack breeding blanket space in the central column region due to the requirement for radiation shielding there to protect the magnets. Thus, typically outboard breeder blankets are used to generate tritium within a spherical tokamak.

The present disclosure proposes the use of a breeder blanket having a neutron moderator layer comprising a metal hydride and/or deuteride, such as yttrium hydride and/or yttrium deuteride, to reduce the energy of neutrons produced by fusion reactions of tritium and/or deuterium and thereby obtain more favourable tritium breeding ratios by increasing the rate of tritium production from $^6$Li provided after the moderator layer. As metal hydrides and deuterides are very effective neutron moderators (i.e. they have a high moderation power per unit volume), the thickness of the moderator layer can be kept small. The high cross section for tritium production from $^6$Li at very low neutron energies ensures that the thickness of the lithium-containing layer can also be kept small without reducing the tritium breeding ratio substantially. Accordingly, the breeder blanket can be used effectively in compact (e.g. spherical) fusion reactors to achieve TBR>1.05.

FIG. 1 shows a vertical cross section through of a spherical tokamak 100 comprising a toroidal field magnet (TF) 102 formed from a plurality of D-shaped TF coils 103A,B (only two of which are shown in FIG. 1) arranged around a central column 104 orientated along an axis A-A', and a plurality of poloidal field (PF) magnets 105A-F, each encircling the central column 104. Electrical current applied to the TF and PF magnets 103A,B, 105A-F generates a closed magnetic field that, when the tokamak is in use, confines, shapes and controls a hot plasma 107 inside a toroidal vacuum vessel 108. On the interior surface of the vacuum vessel 108 there is provided a so-called "blanket" 109 formed from plasma-facing segments or tiles (not shown). The blanket segments are generally configured so as to follow the curvature of the interior surface and may be arranged in a honey-comb structure, for example.

Figure 2:
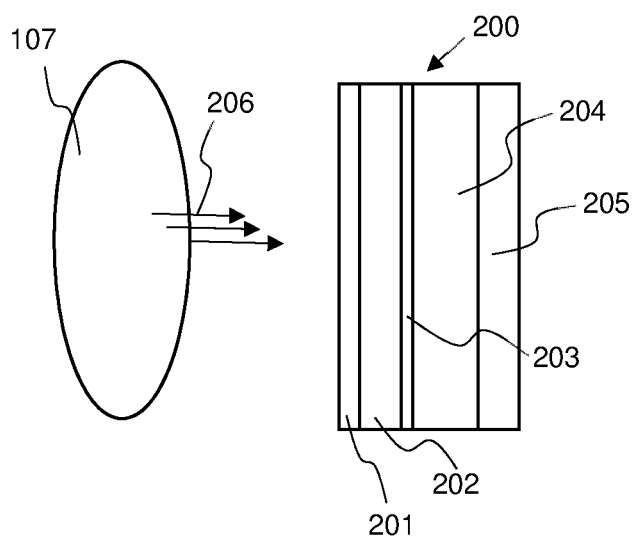
FIG. 2 is a schematic cross section view of a breeder blanket according to an embodiment of the present invention.

FIG. 2 shows a cross section view through an exemplary multi-layered blanket tile 200 used to form the blanket 109. The blanket tile 200 comprises a plasma-facing first wall 201, a neutron moderator layer 202, an intermediate metal (e.g. steel) layer 203, a lithium-containing "breeder" layer 204 (which may include a neutron multiplier, such as lead, tin or beryllium, e.g. in the form of a molten salt) and neutron shielding 205. The blanket tile 200 typically also includes cooling channels or pipes, or heat sink layers, (not shown) in order to allow heat to be extracted from it. Although the various layers of the blanket tile 200 are shown as being provided in a single tile, separate tiles including one or more of the layers may also be used, with the tiles stacked on top of each other in the order shown for the blanket tile 100. In some examples there may be separate tiles for each of the layers, with the tiles being provided in a stacked arrangement to provide the multi-layered arrangement shown in FIG. 2. In another example, the neutron moderator layer 202, the intermediate metal layer 203 and the lithium-containing layer 204 may be provided together as a multi-layered tile, with the first wall 201 and neutron shielding 205 being provided separately.

When the tokamak 100 is operated, neutrons 206 escaping the plasma 107 impinge on the first wall 201 and penetrate through it into the other layers of the blanket 200. The first wall 201 provides a physical boundary between the high-temperature plasma 107 and the rest of the tokamak 100 that acts as thermal and nuclear shielding for the toroidal vacuum vessel 109. In this example, the first wall 201 comprises a layer of tungsten metal bonded to a copper heat sink, but other first wall materials can be used, either in addition to or as alternatives to tungsten such as beryllium or molybdenum, as known in the art.

Neutrons 206 penetrating through the first wall 201 enter the neutron moderator layer 202, which moderates (i.e. reduces) the energy of the neutrons 206, but preferably does not absorb (or reflect) a large fraction of the neutrons. For example, the neutron moderator layer 202 may reduce (i.e. attenuate, either by absorption or reflection) the number of neutrons passing through the moderator layer 202 by less than 20%, preferably less than 40%. The neutron moderator layer 202 comprises a neutron moderator material in the form of a metal hydride and/or deuteride, which in this case is yttrium hydride. Metal hydrides are particularly effective neutron moderator materials because they provide high densities of protons (hydrogen nuclei), which are able to remove kinetic energy efficiently from neutrons by elastic scattering because the masses of proton and neutrons are nearly identical. As a result, the neutron moderator layer 202 can be made relatively thin whilst still allowing a large proportion of the neutrons to be scattered. The moderator layer 202 is configured to maximise the moderation-to-reflection and moderation-to-absorption ratios per unit volume. In this example, the neutron moderator layer 202 is 10 cm thick. However, more generally, the thickness of the neutron moderator layer 202 may be from 0.5 cm to 25 cm, or from 2 cm to 15 cm, whilst still moderating the neutrons 206 passing through the first wall 201 effectively (thereby increasing the rate of tritium breeding in the lithium-containing layer 204) and without reflecting too great a proportion of the neutrons back towards the plasma 107. Although the neutron moderator layer 202 inevitably reflects some of the neutrons 206 incident on the blanket tile 200, the majority of the neutrons 206 are transmitted, i.e. the moderator layer 202 is configured to operate in a transmission mode in which the neutrons are transmitted (with a moderated energy spectrum) rather than a reflection mode. The thickness of the neutron moderator layer 202 may be increased to increase the proportion of the neutrons 206 that are moderated and/or the extent of the moderation on the energy spectrum of the neutrons 206, as characterised by, for example, a reduction in the mean energy of the neutrons 206 exiting the moderator layer 206. The composition of the metal hydride and/or deuteride may also be varied to provide adjust the moderation. For example, the stoichiometry of the metal hydride and/or deuteride may be varied, as discussed below, to increase or decrease the proton density of the material.

In some examples, the neutron moderator layer 202 decreases the energy of neutrons passing through it by more than 95%, by more than 99%, or even by more than 99.9% or 99.99%. The fraction of neutrons 206 that are moderated by this amount can exceed 10%, or 50% or 70% depending on the thickness and/or composition of the neutron moderator layer 202. In some cases, the neutrons may be substantially thermalized to the temperature of the neutron moderator, such that the neutron energies are about 0.025 eV.

Yttrium hydride and/or deuteride (as opposed to other metal hydrides and/or deuterides) is particularly suitable for the neutron moderator layer 202 because yttrium is largely neutron transparent for both fast and slow neutrons. For example, the neutron capture cross section of yttrium-89 (the only naturally occurring isotope of yttrium) is less than 1 to 2 barns for neutron energies between 0.025 eV and 40 MeV.

The lithium-containing layer 204 in this example comprises liquid lithium metal (or alloy) that is enriched to have a high proportion of Lithium-6, i.e. a proportion of lithium-6 in excess of the proportion of lithium-6 in naturally occurring lithium. The slowed neutrons exiting the neutron moderator layer 202 impinge on the lithium-containing layer and generate tritium within it in accordance with the reaction(s) described above for Lithium-6. Lithium may alternatively (or additionally) be provided in the form of a lithium-lead liquid alloy, or a lithium-tin alloy, or a lithium containing alloy, in which the lead or tin is acts as neutron multiplier to increase the number of neutrons within the lithium-containing layer 204 for generating tritium and balancing the neutron leakage within the system. The lithium containing breeder material may also contain the neutron multiplier, e.g. in the form of a molten salt comprising $Li_2F$ and $BeF_2$. The blanket tile 200 preferably comprises one or more inlets and outlets connected to the breeder layer 204 to allow the liquid lithium (or lithium-lead eutectic) to flow into and out of the breeder layer 204 and the generated tritium to be extracted from the blanket tile 200. The inlet and outlet of the blanket tile 200 may be arranged so that the outlet of one blanket tile 200 may be connected to the inlet of another like blanket tile 200 to allow the lithium to flow through the blanket tiles 200 in succession.

The thicknesses of the neutron moderator layer 202 and the lithium-containing layer 204 can be varied to optimise the tritium breeding ratio according to the size, geometry, materials and/or operating conditions of the fusion reactor. Such optimisations can be performed by "neutronics" computer simulations that calculate the neutron fluxes transmitted and reflected by the various materials in the reactor and the rates of nuclear reactions, such as tritium breeding reactions within the lithium-containing layer 204.

Metal hydrides or deuterides other than yttrium hydride or deuteride can also be used as the neutron moderator material, e.g. lithium hydride, titanium hydride and/or zirconium hydride (and/or the corresponding deuterides), either alone or in combination with one another and/or yttrium hydride and/or deuteride. The stoichiometry of the metal hydrides or deuterides may vary depending on the amount of moderation required and the required structural properties of the moderator layer 202. For example, the composition of the metal hydride may be expressed by the chemical formula $MH_x$, where x is the ratio of hydrogen atoms (H) to metal atoms (M) in the material (where M=Y, Li, Ti and/or Zr for example). Typically, x is between 0.5 to 5.5, or between 1.0 to 2.0. In a preferred implementation using yttrium hydride, i.e. $YH_x$, x is in a range from around 1.50 to around 1.92. This range has been found to provide a suitable hydrogen content for effective neutron moderation whilst avoiding the lower decomposition temperatures associated with higher hydrogen contents (i.e. with higher x).

Figure 3:
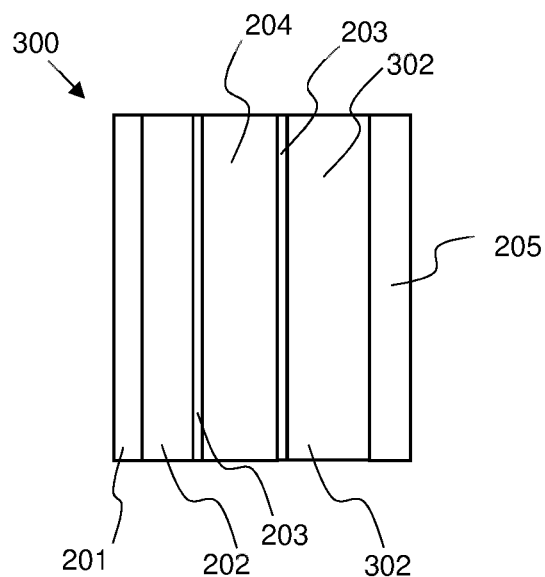
FIG. 3 is a schematic cross section view of a breeder blanket according to an embodiment of the present invention.

FIG. 3, in which elements having the same meaning as in FIG. 2, are given the same reference numerals, shows an alternative blanket tile 300 which is similar to the blanket tile 200 shown in FIG. 2, except that it has an additional neutron moderator layer 302 positioned after the lithium-containing layer 204, i.e. positioned so that the lithium-containing layer 204 is between the two neutron moderator layers 202, 302. In this case, neutrons reflected by the additional neutron moderator layer 302 contribute to the tritium breeding in the lithium-containing layer 204 to increase the tritium breeding ratio further. The thickness of the additional neutron moderator layer 302 may be greater than the thickness of the first neutron moderator layer 202 (i.e. the neutron moderator layer closest to the first wall 201) to ensure that it is more effective at reflecting the neutrons than the first neutron moderator layer 202. The additional neutron moderator layer 302 may comprise metal hydride and/or deuteride as described above for the first neutron moderator layer 202, e.g. yttrium hydride and/or deuteride. Alternatively, or in addition, the additional neutron moderator layer 302 may comprise another moderator material, such as graphite or titanium carbide. The additional neutron moderator layer 302 is preferably separated from the lithium-containing layer 204 by a metal (e.g. steel) layer, as discussed above for the blanket tile 200 of FIG. 2.

Further examples of blanket tiles can be derived from blanket tile 300 by adding one or more further lithium-containing breeder layers after (i.e. in a direction away from the first wall 201) the additional neutron moderator layer 302, with an extra neutron moderating layer provided after each of the further lithium-containing breeder layers, forming an alternating sequence of neutron moderator layers 202, 302 and lithium-containing breeder layers 204. The sequence starts with a neutron moderator layer 202 (adjacent to the first wall 201) and may terminate with either a neutron moderator layer 302 or a lithium-containing layer 204 depending on the design. The sequence may comprise two neutron moderator layers 202, 302 (as in the blanket tile 300 shown in FIG. 3) or it may comprise more than two moderator layers, such as 3, 4 or 5 (and so on) neutron moderator layers 202, 302. As for the blanket tiles 200, 300 shown in FIGS. 2 and 3, each of the neutron moderator layers 202, 303 and lithium-containing layers are separated from one another by layers of steel 203, but it will be appreciated that materials other than steel (e.g. other metals) can be used for this purpose.

Figure 4:
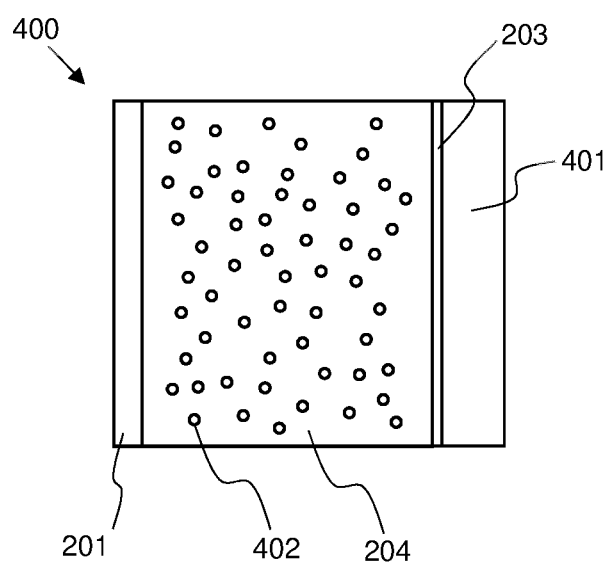
FIG. 4 is a schematic cross section view of a breeder blanket according to an embodiment of the present invention.

FIG. 4 shows another blanket tile 400 comprising a first wall 201, a breeder layer 204 comprising lithium containing material, an intermediate metal (e.g. steel) sheet 203 and a reflector layer 401. The breeder layer comprises pellets 402 of neutron moderator material comprising a metal hydride and/or deuteride (e.g. $YH_x$ and/or $YD_x$), which is encased in metal (e.g. steel) to separate it from the lithium containing material. The pellets 402 are in general dispersed randomly within the breeder layer 402. The reflector layer comprises a neutron reflector material such as C (e.g. graphite), TiC, Be and/or YH.

As described above, the lithium containing material may be in the form of a lithium containing liquid metal alloy (such as a Pb—Li alloy or Sn—Li alloy) or a molten salt, such as $Li_2F$—$BeF_2$, for example. The lithium containing material may alternatively be provided as ceramic pellets of lithium containing material (e.g. pellets of lithium metal). The breeder layer 204 may also comprise pellets of a neutron multiplier material (e.g. beryllium or plumbides ($LaPb_3$ or $YPb_2$, for example)). The use of pellets allows the breeder layer 204 to be cooled by passing a cooling fluid (e.g. a gas, for example, He) in the gaps between the pellets. Including the neutron moderator material within the breeder layer may allow a greater TBR because a greater proportion of neutrons reflected by the neutron moderator material pellets 204 may be absorbed by the lithium containing material. The pellets 204 may also be easily removed from/reintroduced into the breeder layer 204 for maintenance or replacement, or to vary the amount of neutron moderating material within the breeder layer 204.

The pellets 204 may, in general, be any size or shape, e.g. spherical, cylindrical or ellipsoidal. For example, the pellets 204 may be spherical pellets with a core containing the neutron moderator material having a diameter of around 2.5 to 10 mm and an outer steel casing that is about 0.5 mm to about 1 mm thick.

Figure 5:
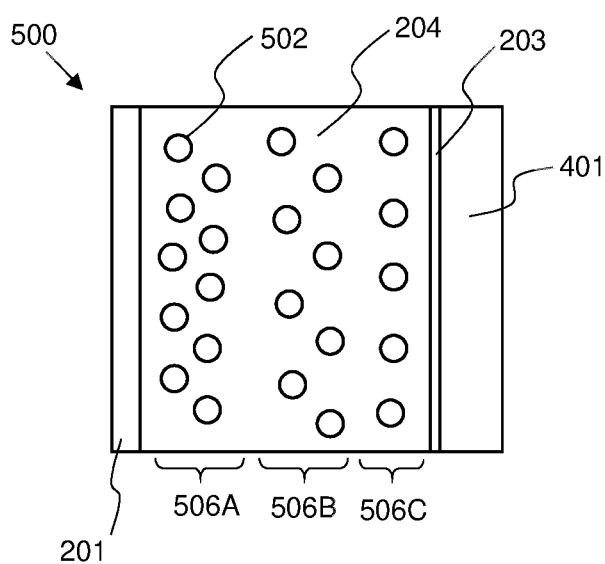
FIG. 5 is a schematic cross section view of a breeder blanket according to an embodiment of the present invention.

FIG. 5 shows another blanket tile 500 in which the pellets 402 are replaced by cylinders or rods 502 of the neutron moderator material, i.e. elements of the neutron moderator material having a longitudinal axis that is substantially larger than the other two axes. The rods 502 may be oriented within the breeder layer 204 so that their longitudinal axis is vertical to minimise bending strain. The cross section of the rods 502 may have any shape, e.g. circular, hexagonal. As with the pellets 402, the rods 502 are surrounded by a metal (e.g. steel) layer.

The rods 502 may be regularly spaced apart from one another or they may have a spacing that varies within the breeder layer 204. For example, as shown in FIG. 5, the rods 502 may be more closely spaced nearer to the first wall 201 to create a first region 506A which has a relatively high moderating ability, and there may be one or more subsequent (i.e. further from the first wall 201) regions 506B, C in which the spacing of the rods is increased relative to the first region 506A (or equivalently, in which the density of the rods is lower). These latter regions 506B, C are less moderating than the first region 506A, but may provide a greater contribution to the TBR on account of the increased proportion of lithium containing material in these regions and the moderating effect of the first region 506A on the neutrons reaching the regions 506B, C. Alternatively or additionally, the rods 502 in each of the regions 506A-C may have different diameters (i.e. thickness) to vary the amount of moderation. For example, the diameter of the rods may range from 0.5 cm to 5 cm.

The rods 502 are preferably supported by fixings that allow the rods 502 to be removed from the blanket tile 500 for maintenance and/or replacement. Preferably, each rod is inserted into a metal tube that passes through the breeder layer 204 and supports the rod 502 in place. The metal tube is sealed to ensure no contact between its contents and the breeder material. Preferably, to facilitate maintenance, the fixings releasably clamp the metal tubes or the rods 502 in position, e.g. so that they can be removed from the fixing by sliding, without first requiring human intervention, without requiring bolts to be loosened or removed, for example. This avoids workers being exposed to high levels of radioactivity during maintenance. The rods 502 are preferably inserted from the top of the metal tube so that they are held in place by gravity, thereby allowing them to be removed easily. The bottom of the metal tubes is preferably sealed with steel to ensure that there are no leaks. The neutron moderator material including the metal hydride/deuteride may additionally be sealed within another to avoid potential problems with outgassing at temperatures greater than about 650 degrees Celsius (which is the temperature at which yttrium hydride/deuteride material starts to decompose).

In some implementations, the breeder blanket may be water cooled. For example, the breeder blanket may be connected to a cooling system configured to circulate water through channels within (or that are adjacent to) the breeder blanket. In such cases, it may be preferable to reduce the moderating power of the neutron moderator material by increasing the ratio of deuterium to hydrogen in the moderator material to take into account the additional moderation provided by the water, i.e. the contribution made by the water to the moderation of neutrons in the breeder blanket. For example, where the water coolant provides significant moderation of the neutrons in the breeder blanket then the proportion of deuterium (i.e. the number of deuterium nuclei divided by the total number of hydrogen and deuterium nuclei) in the metal hydride/deuteride neutron moderator material may be greater than 20% or greater than 40%, for example. In some cases, the proportion of deuterium in the neutron moderator material may even be 100%. In other implementations, in which the breeder blanket is cooled by a mechanism other than water cooling (e.g. gas cooling, molten metal or molten salt cooling), or in which the water coolant does not moderate the neutrons in the breeder blanket appreciably, then a different proportion of deuterium may be preferred. For example, the deuterium proportion may between 2% and 38%, preferably between 10% and 30%, and more preferably around 20%. The metal hydride/deuteride used as the moderator material in such cases may be zirconium hydride/deuteride (e.g. $ZrH_2/ZrD_2$) or yttrium hydride/deuteride, for example.

Whilst lithium-6 enrichment can improve the TBR in many cases, the choice of breeder material and/or the presence of a neutron multiplier material within the breeder material should be considered. For example, where there is substantial neutron multiplication inside the blanket (e.g., a lithium-lead or "FLiBe", lithium fluoride and beryllium fluoride, blanket), higher TBR may be achieved by increasing the amount of metal deuteride (relative to the metal hydride) in the neutron moderator material. For example, the neutron moderator material may comprise more than 10%, more than 30%, or even more than 50% metal deuteride, e.g. yttrium deuteride, with any remaining neutron moderator material being metal hydride. In such cases, the lower moderating power of the metal deuteride (compared to metal hydride) may allow more neutrons to be generated by the neutron multiplier material. The resulting "soft" spectrum of the neutrons generated by the neutron multiplier material (i.e., a spectrum dominated by <5 MeV neutrons), then produces a greater TBR for enriched lithium-6 as a result of the low-energy (n, T) reaction rate being higher for lithium-6 than lithium-7. Conversely, where the breeder blanket lacks a dedicated neutron multiplier (e.g., implementations in which the breeder material is liquid lithium or lithium hydride) then it may be preferable to use non-enriched (i.e. natural) lithium in the breeder material in combination with a metal hydride (as opposed to metal deuteride) neutron moderator material. The TBR is enhanced in such cases by the (n, T) reaction occurring in the more abundant lithium-7.

One or more of the rods 502 may be replaced with a rod comprising a surveillance specimen and/or experimental device for measuring the neutron flux through the blanket tile 500, e.g. for qualification and safety case substantiation. One or more of the rods 502 may also comprise a specimen for materials testing, e.g. to determine the behaviour of a particular material under neutron irradiation. The specimen may also be used in some cases to produce isotopes of one or more elements, e.g. for medical imaging and/or treatment. For example, the specimen may be an isotope production alloy (e.g. molybdenum-99 and iodine-131) comprising one or more metals from which a particular isotope may be produced following exposure of the alloy to neutrons produced by the fusion reactor. The locations of such rods within the blanket tile 502 may be optimised according to the neutron energy spectrum required for efficient isotope production. For example, isotope production alloys requiring a low energy neutron spectrum may be preferentially located at the rear of the tile 500 (i.e. away from the centre of the fusion reactor) so to maximise the transmutation rate of the isotope of interest.

One or more of the rods 502 may be replaced with a rod comprising a sealed tube of fission waste stream material, such as Pu, Np, Am, and Cm, and a plethora of fission products (Cs, Sr). The neutron flux produced by the fusion reactor transmutes these isotopes to daughter isotopes that have significantly shorter half-lives and reduces waste heat generation, which could allow for increased packing factor of geological disposed high level waste. These rods could be considered as transmutation rods for nuclear waste. In general these tubes are sealed to contain fission gas (if generated) and are preferably adapted be cooled externally.

Including the moderator material within the breeder layer 204 may in some cases allow the overall thickness of the blanket tile 400, 500 to be reduced whilst nevertheless retaining a high TBR. Inclusion of the moderating material could also tailor the type of isotopes produced by altering the neutron energy spectrum.

While various embodiments of the present invention have been described above, it should be understood that they have been presented by way of example, and not limitation. It would be apparent to one skilled in the relevant art(s) that various changes in form and detail could be made therein without departing from the spirit and scope of the invention. Thus, the present invention should not be limited by any of the above-described exemplary embodiments, but should be defined only in accordance with the following claims and their equivalents.

The invention claimed is:

1. A breeder blanket for generating tritium using neutrons produced by nuclear fusion of deuterium and/or tritium within a plasma confined within a fusion reactor, the breeder blanket comprising:
   a plasma-facing first wall;
   a breeder layer comprising lithium-containing material for generating tritium from the neutrons, the lithium-containing material being provided in the form of liquid lithium metal or alloy, or a molten salt; and
   neutron moderator material comprising a yttrium hydride and/or a yttrium deuteride arranged between the first wall and the lithium-containing material.

2. A breeder blanket according to claim 1, wherein the neutron moderator material is provided as a neutron moderator layer arranged between the first wall and the breeder layer.

3. A breeder blanket according to claim 2, wherein the neutron moderator layer is configured to transmit more than 60% of neutrons having an energy of 14 MeV prior to entering the neutron moderator layer.

4. A breeder blanket according to claim 2, wherein the neutron moderator layer is configured to reduce the energy of at least a proportion of the transmitted neutrons by more than 95%, the neutrons having an energy of 14 MeV prior to entering the neutron moderator layer.

5. A breeder blanket according claim 4, wherein said proportion is greater than 25%.

6. A breeder blanket according to claim 2, wherein the thickness of the neutron moderator layer is from 0.5 cm to 25 cm.

7. A breeder blanket according to claim 2, wherein the thickness of the breeder layer is from 1 cm to 200 cm.

8. A breeder blanket according to claim 2 and comprising another neutron moderator layer comprising a yttrium hydride and/or a yttrium deuteride, the breeder layer being arranged between the neutron moderator layers.

9. A breeder blanket according to claim 8, wherein the other neutron moderator layer is configured to reflect a greater proportion of neutrons than the neutron moderator layer between the first wall and the breeder layer.

10. A breeder blanket according to claim 8, wherein the other neutron moderator layer is thicker than the neutron moderator layer.

11. A breeder blanket according to claim 8 and comprising another breeder layer comprising lithium containing material for generating tritium from the neutrons, the other neutron moderator layer being arranged between the breeder layers.

12. A breeder blanket according to claim 2, wherein the breeder layer and the neutron moderator layer are separated from one another by one or more metal layers.

13. A breeder blanket according to claim 1, wherein the neutron moderator material is provided within the breeder layer, the neutron moderator material being separated from the lithium containing material in the breeder layer by one or more layers of metal.

14. A breeder blanket according to claim 13, wherein the breeder layer comprises a plurality of pellets comprising the neutron moderator material, the pellets being dispersed within the lithium containing material.

15. A breeder blanket according to claim 13, wherein the breeder layer comprises a plurality of rods comprising the neutron moderator material.

16. A breeder blanket according to claim 15 and comprising releasable fixings for holding each of the rods in a fixed position within the breeder layer, the fixings being configured to allow the rods to be removed from and replaced within the breeder layer.

17. A breeder blanket according to claim 15, wherein the breeder layer comprises a first region located closer to the first wall than a second region, the rods in the first region being more closely spaced from one another than the rods in the second region.

18. A breeder blanket according to claim 1, wherein the ratio of yttrium atoms to hydrogen or deuterium atoms in the yttrium hydride and/or yttrium deuteride is from 1.0 to 2.0.

19. A fusion reactor comprising one or more breeder blankets according to claim 1.

20. A method of operating a fusion reactor according to claim 19, comprising generating tritium using the one or more breeder blankets and neutrons produced by nuclear fusion of deuterium and/or tritium within the fusion reactor and introducing the generated tritium into a plasma confined within the fusion reactor.

* * * * *